UNITED STATES PATENT OFFICE.

JOHN J. LYNCH AND JAMES F. CROWLEY, OF ROCHESTER, NEW YORK.

WOOD-FILLER.

SPECIFICATION forming part of Letters Patent No. 450,296, dated April 14, 1891.

Application filed January 19, 1891. Serial No. 378,313. (No specimens.)

*To all whom it may concern:*

Be it known that we, JOHN J. LYNCH and JAMES F. CROWLEY, of Rochester, in the county of Monroe and State of New York, have invented a certain new and Improved Wood-Filler; and we do hereby declare the following to be such a full, clear, and exact description of the same as will enable those skilled in the art to which it appertains to make and use it.

Our present invention has for its object to provide a filler for wood, preferably for use on hard woods—such as oak, ash, chestnut, &c.—that will fill the pores thereof and permit the application of varnish without the latter being absorbed, thus enabling a hard fine finish to be given articles, and to provide a filler also that flows readily and does not require rubbing, which latter operation consumes considerable time.

Our improved filler consists of the following ingredients, combined in substantially the following proportions, which latter may, however, be slightly varied: turpentine, one pint; japan, one pint; linseed-oil, one-half pint; wood-alcohol, one-half pint; resin, (gum,) one pound; benzine, two and one-half pints; bisulphide or carbon, one gill; gutta-percha, two ounces; talc, two pounds.

In preparing our filler we first dissolve the gutta-percha (preferably in sheet form) in the bisulphide of carbon or its equivalent solvent, so that it (the solution) will readily combine with the other liquid ingredients. The resin (gum) is then melted by the application of a gentle heat and mixed with the linseed-oil, which is also warmed to prevent chilling and a solution formed. These gutta-percha and resin solutions are then mixed with the other ingredients mentioned above and the liquid stirred to insure a thoroughly-mixed and homogeneous compound. This constitutes the filler proper, and it may, as will be understood, be colored to suit the taste or object of the maker by the addition of any suitable coloring-matter ordinarily mixed with spirits or oil, such as burnt umber, raw umber, yellow, black, burnt sienna, asphaltum, &c.

This filler is applied to the wood by means of a brush like varnish or shellac and does not require rubbing or cleaning, but fills the pores of the wood perfectly and dries hard in from ten to twelve hours, when the article may be varnished and polished in any of the well-known ways, showing up the grain of the wood clear and forming a beautiful finish particularly adapted for fine furniture.

Some modifications of the ingredients may be made without departing from the spirit of our invention. As, for instance, instead of employing the wood-alcohol in the solution, we may increase the quantity of bisulphide of carbon, or the equivalent solvent, to three gills and dispense with it, the gutta-percha being dissolved before the formation of the solution, as described; also, instead of employing turpentine, this may be dispensed with and double the amount of japan, which we regard as its equivalent, used instead; but we prefer all the ingredients employed, as we have found in practice that a better article is produced and one somewhat cheaper than where the above modifications are made.

The talc, which we prefer to use, is of course only one form of material for giving body to the filler, and other substances, its recognized equivalents, could readily be employed instead.

We claim as our invention—

1. A wood-filler composed of japan, oil, resin, benzine, bisulphide of carbon, gutta-percha, and a body material, such as talc, substantially as described.

2. A wood-filler composed of turpentine, japan, oil, alcohol, resin, benzine, bisulphide of carbon, gutta-percha, and a body material, such as talc, substantially as described.

JOHN J. LYNCH.
JAMES F. CROWLEY.

Witnesses:
FRED F. CHURCH,
M. H. BRIGGS.